United States Patent
Liu et al.

(10) Patent No.: US 8,789,129 B2
(45) Date of Patent: Jul. 22, 2014

(54) TELEVISION AND METHOD FOR OPERATING THE SAME

(75) Inventors: Chien-Tsuen Liu, Taipei Hsien (TW); Yung-Chih Lin, Taipei Hsien (TW)

(73) Assignee: Wistron Corp., New Taipei (TW)

( * ) Notice: Subject to any disclaimer, the term of this patent is extended or adjusted under 35 U.S.C. 154(b) by 1030 days.

(21) Appl. No.: 12/498,371

(22) Filed: Jul. 7, 2009

(65) Prior Publication Data

US 2010/0154004 A1 Jun. 17, 2010

(30) Foreign Application Priority Data

Dec. 15, 2008 (TW) .............................. 97148825 A

(51) Int. Cl.
| | |
|---|---|
| H04N 7/16 | (2011.01) |
| H04N 7/173 | (2011.01) |
| H04N 5/445 | (2011.01) |
| H04N 21/44 | (2011.01) |
| H04N 21/41 | (2011.01) |
| H04N 21/47 | (2011.01) |
| H04N 21/462 | (2011.01) |
| G10L 15/26 | (2006.01) |

(52) U.S. Cl.
CPC .............. *H04N 5/445* (2013.01); *H04N 21/47* (2013.01); *H04N 21/44008* (2013.01); *H04N 21/4622* (2013.01); *H04N 21/4113* (2013.01); *G10L 15/26* (2013.01)

USPC .......................................... 725/136; 725/110

(58) Field of Classification Search
None
See application file for complete search history.

(56) References Cited

U.S. PATENT DOCUMENTS

| | | | | |
|---|---|---|---|---|
| 4,974,195 | A  * | 11/1990 | Amari et al. ................... | 715/234 |
| 7,689,613 | B2 * | 3/2010 | Candelore ...................... | 707/707 |
| 2002/0169605 | A1* | 11/2002 | Damiba et al. ................ | 704/235 |
| 2003/0237092 | A1 | 12/2003 | Suzuki | |
| 2008/0266449 | A1 | 10/2008 | Rathod et al. | |
| 2009/0119717 | A1* | 5/2009 | Newton et al. .................. | 725/59 |
| 2009/0174821 | A1* | 7/2009 | Matsuo et al. ................. | 348/725 |

FOREIGN PATENT DOCUMENTS

| | | |
|---|---|---|
| CN | 1723458 | 1/2006 |
| CN | 1723458 A | 1/2006 |
| CN | 1825936 A | 8/2006 |
| CN | 200987202 | 12/2007 |
| CN | 101296362 A | 10/2008 |
| JP | 2004-023641 | 1/2004 |
| JP | 2005-115790 | 4/2005 |
| JP | 2008-193580 | 8/2008 |
| WO | WO2007072821 | 6/2007 |

* cited by examiner

*Primary Examiner* — Mark D Featherstone
(74) *Attorney, Agent, or Firm* — CKC & Partners Co., Ltd.

(57) ABSTRACT

In the specification and drawing a television is described and shown with a multimedia player for playing information, a grabber for producing a word from the information and a controller for controlling a computer to search for data related to the word. Moreover, a method for operating the television is also disclosed in the specification and drawing.

10 Claims, 3 Drawing Sheets

TELEVISION AND METHOD FOR OPERATING THE SAME

RELATED APPLICATIONS

This application claims priority to Taiwan Application Serial Number 97148825, filed Dec. 15, 2008, which is herein incorporated by reference.

BACKGROUND

1. Field of Invention

The present invention relates to a control method, system and equipment. More particularly, the present invention relates to a television and a method for operating the same.

2. Description of Related Art

Nowadays, people usually get their information from a television or a computer, such as a Home Theater Personal Computer (HTPC). Both these two are in the living room. The user only uses either the television or the computer in many cases. When the user watches a television program, he or she may want to know more information or statements about the television program; nevertheless, the user often passively waits for the television program to show something. Even if the television program shows more details, the user may unlike these details; besides, the television program often does not show any further details.

Users want to know different kinds of details. For example, if the television program shows a "whale", a user may want to know the weight of the whale; alternatively, if the television program showed "fireworks celebrating National Day", the user may want to know the place where the fireworks would be shot off; alternatively, if the user glanced at half of a movie being shown on television, he or she may want to know the time the movie is replayed.

In general, the user usually turns on the computer, opens the browser and types keywords to find the answer. However, this procedure is very cumbersome and time-consuming. In view of the foregoing, there is a need in the related field to provide a means for efficiently searching for information played on TV.

SUMMARY

The following presents a simplified summary of the disclosure in order to provide a basic understanding to the reader. This summary is not an extensive overview of the disclosure and it does not identify key/critical elements of the present invention or delineate the scope of the present invention. Its sole purpose is to present some concepts disclosed herein in a simplified form as a prelude to the more detailed description that is presented later.

In one or more aspects, the present disclosure is directed to a television and a method for operating the same.

In accordance with an embodiment of the present disclosure, the television comprises a multimedia player, a grabber and a controller. The multimedia player can play information; the grabber can produce at least one word from the information; the controller can control the computer to search for data related to the word.

In accordance with another embodiment of the present disclosure, the method for operating the television comprises following steps. When the television plays information, at least one word is produced from the information; then, a computer is controlled to search for data related to the word.

Accordingly, if a user watched the television and wanted to inquire information played by the television, he or she can use the television to control the computer to search the related data.

Many of the attendant features will be more readily appreciated, as the same becomes better understood by reference to the following detailed description considered in connection with the accompanying drawings.

BRIEF DESCRIPTION OF THE DRAWINGS

The present description will be better understood from the following detailed description read in light of the accompanying drawings, wherein.

Like reference numerals are used to designate like parts in the accompanying drawings.

DESCRIPTION OF THE PREFERRED EMBODIMENTS

Figure 1:
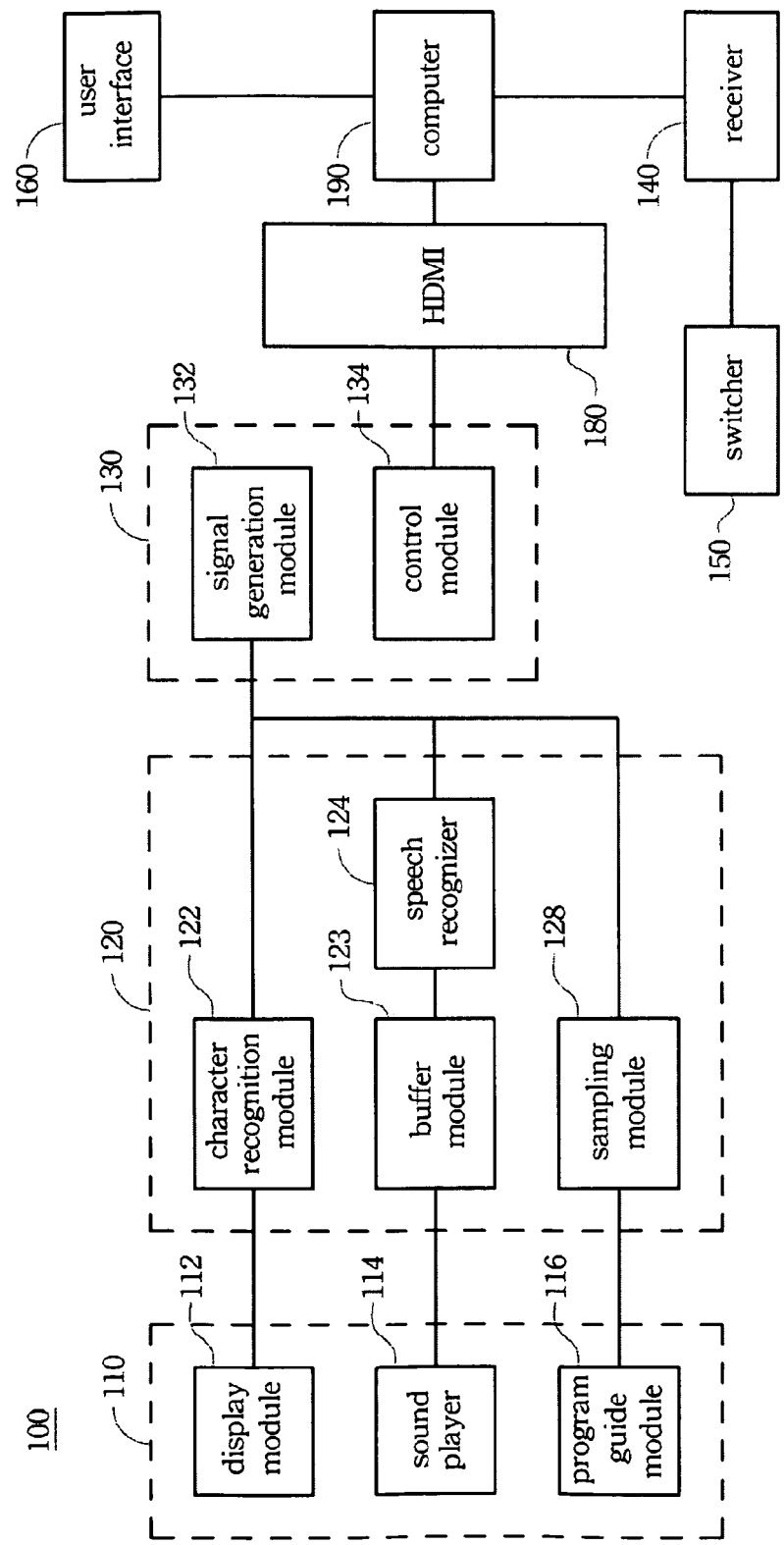
FIG. 1 is a schematic diagram of a television according to an embodiment of the present disclosure.

Reference will now be made in detail to the present preferred embodiments of the invention, examples of which are illustrated in the accompanying drawings. Wherever possible, the same reference numbers are used in the drawings and the description to refer to the same or like parts.

In one aspect of the present disclosure is directed to a television in which multiple functions are integrated for increasing the convenience of use. It should be noted that the television could control a computer.

Please refer to FIG. 1. FIG. 1 is a schematic diagram of a television according to an embodiment of the present disclosure. In FIG. 1, the television 100 comprises a multimedia player 110, a grabber 120 and a controller 130. The multimedia player 110 can play information, such as video, sound, an electronic program guide or the like; the grabber 120 can produce at least one word from the information; the controller 130 can control the computer 190 to search for data related to the word.

For instance, if a user watched a television program shown on the television 100 and wanted to inquire information in the television program, he or she can use the television 100 to control the computer 190 to search the related data.

In addition, the television 100 comprises a high definition multimedia interface (HDMI) 180. The high definition multimedia interface 180 could be electrically coupled to the computer 190. For the television 100 and the computer 190, the high definition multimedia interface 180 acts as a common pipeline for data transmission.

Thereupon, the controller 130 can control the computer 190 via the high definition multimedia interface 180. For a more complete understanding of the controller 130, please continue to refer FIG. 1. In FIG. 1, the controller 130 can comprise a signal generation module 132 and a control module 134. The signal generation module 132 can generate a CEC command according to the word, wherein the CEC command is based on Consumer Electronics Control (CEC); the control module 134 can command the computer 190 to search the word from internet via the high definition multimedia interface 180 according to the CEC command.

The Consumer Electronics Control provides varied controls for apparatuses connecting the high definition multimedia interface so as to facilitate operation of the television 100 and the computer 190.

In another embodiment, the controller 130 can control the computer 190 via another transmission interface; alternatively, the controller 130 can control the computer 190 by means of short-haul communication, such as bluetooth, infrared or the like.

For a more complete understanding of the multimedia player 110 and the grabber 120, multimedia player 110 and the grabber 120 are expounded by reference to the following description considered in FIG. 1.

In one aspect, the multimedia player 110 comprises a display module 112, and the grabber 120 comprises a character recognition module 122. The display module 112 can display at least one frame; the character recognition module 122 can recognize one or more words in the frame.

Furthermore, the character recognition module 122 can recognize the word in the frame by means of optical character recognition; for example, the character recognition module 122 may be optical character recognition equipment, an optical character recognition machine, an optical character recognition system or the like.

When the television 100 plays videos, the display module 112 can display the frame of the video, and the character recognition module 122 can recognize subtitles in the frame. Moreover, the character recognition module 122 can divide the subtitles into various words by means of automatic hyphenation.

In another embodiment, the grabber 120 comprises a hyphenation dictionary, and the character recognition module 122 can divide the subtitles in the frame into various words according to the hyphenation dictionary.

For instance, the television 100 may collocate a remote control; if a user watched a frame of the television 100 and wanted to inquire about a word in the frame, he or she can use the remote control to operate the television 100, whereby the character recognition module 122 recognizes various words in the frame for ordering the screen of the television 100 to show these words. The user can use the remote control to choose one of these words and thereby order the computer 190 to search the chosen word.

In another aspect, the multimedia player 110 comprises a sound player 114, and the grabber 120 can comprises a buffer module 123 and a speech recognizer 124. The sound player 114 can play sound; the buffer module 123 can store a wave file according to the sound, and the speech recognizer 124 can transform the wave file into the word.

The sound player 114 may comprise a signal receiver, a volume controller and a loudspeaker. The signal receiver can receive an audible signal, and the loudspeaker can play sound according to the audible signal; furthermore, the volume controller can adjust the voice volume of the loudspeaker. Therefore, the buffer module 123 can temporarily store the wave file according to the audible signal; for example, the buffer module 123 is a buffer or the like for temporary storage.

Furthermore, the speech recognizer 124 can analyze speech sounds of the wave file and transform the sounds into words with isolated word speech recognition; for example, the speech recognizer 124 is a speech recognition system, a voice recognition terminal, a voice-recognition unit or the like.

For instance, the television 100 may collocate a remote control; if a user watched a television program on the television 100 and wanted to inquire content spoken in the television program, he or she can use the remote control to operate the television 100, whereby the speech recognizer 124 can recognize various words of the content for ordering the screen of the television 100 to show these words. The user can use the remote control to choose one of these words and thereby order the computer 190 to search the chosen word.

In yet another aspect, the multimedia player 110 comprises a program guide module 116, and the grabber 120 comprises a sampling module 128. The program guide module 116 can display an electronic program guide; the sampling module 128 can acquire the word from, the electronic program guide.

For instance, the television 100 may collocate a remote control and display the electronic program guide with a TV schedule; if a user wanted to inquire a television program in the TV schedule, he or she can use the remote control to operate the television 100, whereby the sampling module 128 can acquire the name of television program from the electronic program guide and thereby order the computer 190 to search for data related the television program.

In one embodiment, the frame displayed in the computer 190 could be switched to the television 100 so as to increase the convenience of use. In FIG. 1, the television 100 comprises a receiver 140 and a switcher 150. The computer 190 can display at least one frame; the receiver 140 can acquire a frame from the computer 190, and the switcher 150 can show the frame.

Furthermore, the receiver 140 can receive the frame outputted from the computer 190 via the high definition multimedia interface 180 or the like and thereby acquire the frame with the high definition interface. The switcher 150 can show the frame outputted from the computer 190 on the screen of the television 100.

For instance, the television 100 can order the computer 190 to search a character string; the computer 190 responds to the television 100 and executes a browser to link a search engine and thereby search the character string. As the character string is searched, the computer 190 can send an acknowledgement character to the television 100; thus, the television 100 can acquire a frame outputted from the computer 190 and show the frame on the screen thereof, where the frame outputted from the computer 190 has result about the searched character string.

Moreover, the television 100 may comprise the user interface 160. The user interface 160 can operate the computer 190.

In practice the user interface 160 could be a software keyboard, a graphical user interface or a tactile user interface so as to facilitate use. One of ordinary skill in the art will appreciate that the above examples are provided for illustrative purposes only to further explain applications of the present invention and are not meant to limit the present invention in any manner. Other human-machine interfaces may be used as appropriate for a given application.

For instance, the television 100 may comprise a remote control; a user can use the remote control to operate the computer 190 after the television 100 shown the frame outputted from the computer 190 on the screen thereof. For example, the arrow keys of the remote control act as the mouse of the computer 190, and the numeric keys of the remote control act as the keyboard of the computer 190. Additionally or alternatively, the user interface 160 may comprise a software keyboard, displayed on the screen of the television 100, for the sake of the input methods of the varied families of languages.

In another aspect of the present disclosure is directed to a method for operating a television in which multiple functions are integrated for increasing the convenience of use. It should be noted that the method could operate the television to control a computer.

Figure 2:
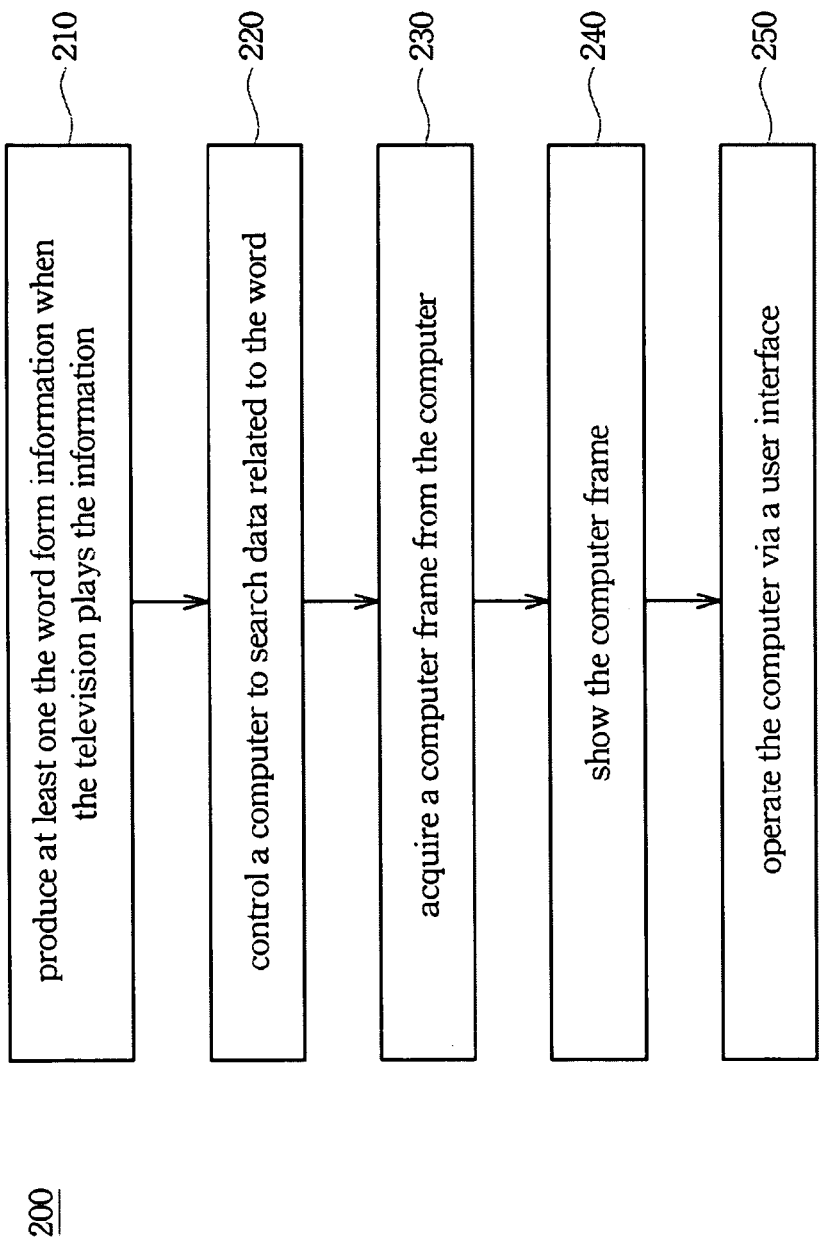
FIG. 2 shows a flow chart of a method for operating a television according to an embodiment of the present disclosure.

Please refer to FIG. 2. FIG. 2 shows a flow chart of a method 200 for operating a television according to an embodiment of the present disclosure. The method 200 comprises step 210 and step 220. In the method 200, it should be noted that one step might be performed in series, in parallel, in combination, or otherwise in conjunction with another if the specific order is not described or inferred in the embodiment.

In step 210, at least one the word is produced when the television plays the information; in step 220, a computer is controlled to search for data related to the word.

For instance, if a user watched a television program shown on the television and wanted to inquire information in the television program, he or she can use the television to control the computer to search the related data.

In one embodiment, a frame displayed in the computer could be switched to the television so as to increase the convenience of use. In FIG. 2, the method 200 comprises step 230 and step 240. In step 230, a frame acquired from the computer; in step 240, the frame is shown.

During step 230, the frame outputted from the computer is received via the high definition multimedia interface or the like and thereby acquire the frame with high definition. During step 240, the frame outputted from the computer is shown on the screen of the television 100.

For instance, the television can order the computer to search character string; the computer responsive to the television executes its browser to link a search engine and thereby search the character string. As the character string is searched, the computer can send an acknowledgement character to the television; thus, the television can acquire a frame outputted from the computer and show the frame on the screen thereof, where the frame outputted from the computer 190 has result about the searched character string.

In FIG. 2, the method 200 comprises step 250 and step 250. In step 250, the computer is operated via a user interface.

In practice the user interface could be a software keyboard, a graphical user interface or a tactile user interface so as to facilitate use. One of ordinary skill in the art will appreciate that the above examples are provided for illustrative purposes only to further explain applications of the present invention and are not meant to limit the present invention in any manner. Other human-machine interfaces may be used as appropriate for a given application.

For instance, the television may comprise a remote control; a user can use the remote control to operate the computer after the television shown the frame outputted from the computer on the screen thereof. For example, the arrow keys of the remote control act as the mouse of the computer 190, and the numeric keys of the remote control act as the keyboard of the computer. Additionally or alternatively, the user interface may comprise a software keyboard, displayed on the screen of the television, for the sake of the input methods of the varied families of languages.

Figure 3:
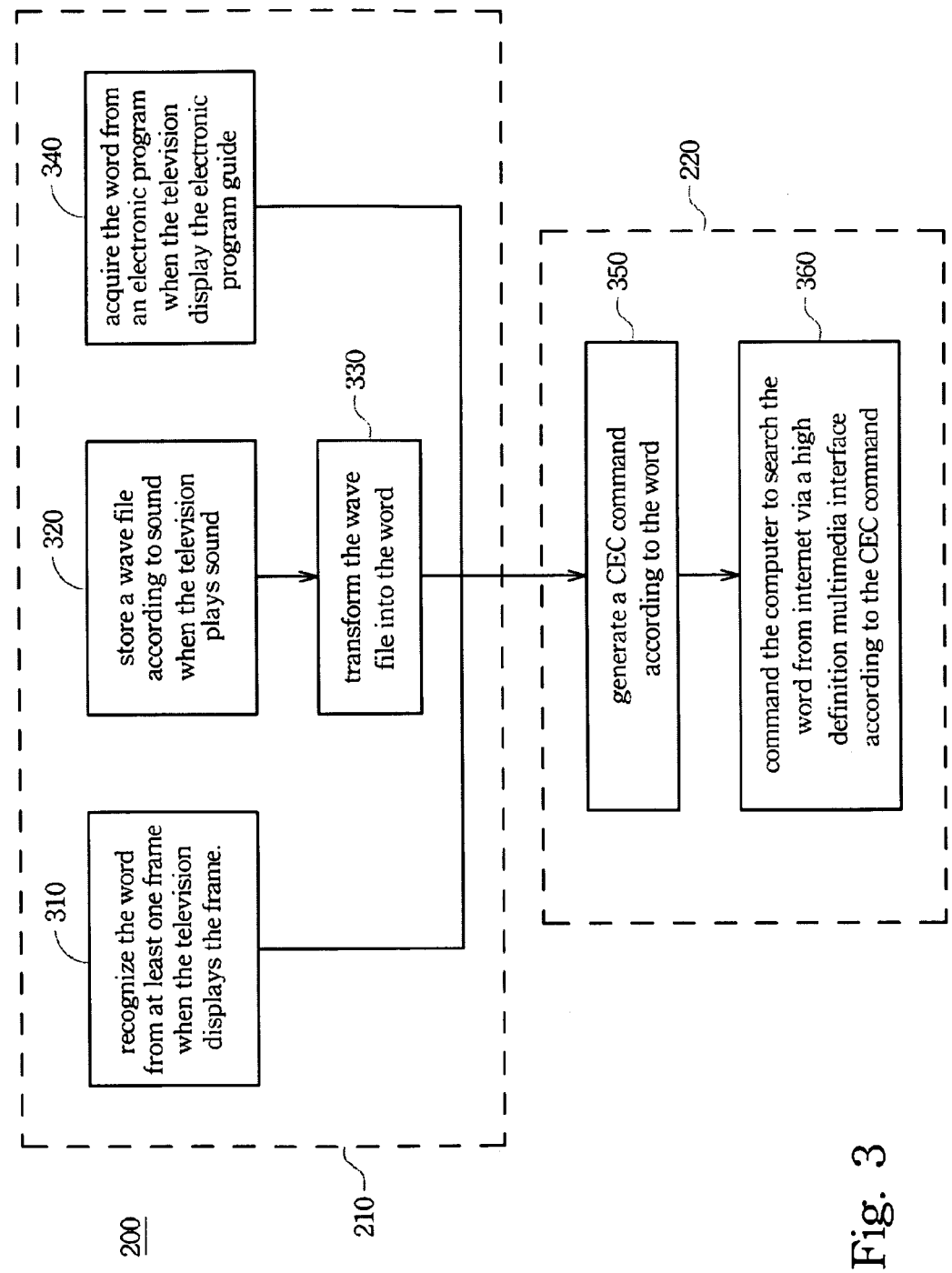
FIG. 3 shows a flow chart of sub-steps of the method for operating a television.

For a more complete understanding of step 210 and step 220, step 210 and step 220 are expounded by reference to the following description considered in FIG. 3.

Please refer to FIG. 3. FIG. 3 shows a flow chart of sub-steps of the method 200 for operating a television. In one aspect, step 210 comprises sub-step 310. In sub-step 310, when the television displays at least one frame, one or more words in the frame are recognized.

Furthermore, one or more words are recognized in the frame by means of optical character recognition during sub-step 310.

When the television is used for playing at least one frame of video such as movie, subtitles in the frame are recognized in sub-step 310; additionally, the subtitles are divided into various words by means of automatic hyphenation.

In another embodiment, the subtitles in the frame are divided into various words according to the hyphenation dictionary during sub-step 310.

For instance, the television may collocate a remote control; if a user watched a frame of the television and wanted to inquire a word in the frame, he or she can use the remote control to operate the television, whereby various words in the frame are recognized in sub-step 310 for ordering the screen of the television to show these words. The user can use the remote control to choose one of these words and thereby order the computer to search the chosen word.

In another aspect, step 210 comprises sub-step 320 and sub-step 330. In sub-step 320, when the television plays sound, a wave file is stored according to the sound; in sub-step 330, the wave file is transformed into the word.

During sub-step 320, when the television receives an audible signal, its loudspeaker can play sound according to the audible signal; therefore, the wave file is temporarily stored in a buffer or the like according to the audible signal.

During sub-step 330, information of speech sounds of the wave file is analyzed, and then the information of speech sounds is transformed into words by means of isolate word speech recognition.

For instance, the television may collocate a remote control; if a user watched a television program on the television and wanted to inquire content spoken in the television program, he or she can use the remote control to operate the television, whereby various words of the content are recognized in sub-step 330 for ordering the screen of the television to show these words. The user can use the remote control to choose one of these words and thereby order the computer 190 to search the chosen word.

In yet another aspect, step 210 comprises sub-step 340. In sub-step 340, when the television displays an electronic program guide, the word is acquired from the electronic program.

For instance, the television may collocate a remote control and display the electronic program guide with a TV schedule; if a user wanted to inquire a television program in the TV schedule, he or she can use the remote control to operate the television, whereby the name of television program is acquired from the electronic program guide in sub-step 340 and thereby order the computer to search for data related the television program.

In addition, the television may comprise a high definition multimedia interface; therefore, a computer is controlled via the high definition multimedia interface in step 220. In view of this, step 220 comprises sub-step 350 and sub-step 360. In sub-step 350, a CEC command is generated according to the above-mentioned word; in sub-step 360, the computer is commanded to search the word from Internet via the high definition multimedia interface according to the CEC command.

The Consumer Electronics Control provides varied controls for apparatuses connecting the high definition multimedia interface so as to facilitate operation of the television and the computer.

In another embodiment, the computer is controlled via another transmission interface; alternatively, the computer is controlled by means of short-haul communication, such as bluetooth, infrared or the like.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A television, comprising:
   a multimedia player for playing information, wherein the multimedia player comprises a display module for displaying at least one frame;
   a grabber for producing at least a word from the information, wherein the grabber comprises a hyphenation dictionary and a character recognition module for recognizing subtitles in the frame that is displayed by the display module and further for dividing the subtitles that are recognized in the frame into various words according to the hyphenation dictionary;
   a high definition multimedia interface connected to a computer;
   a controller for controlling the computer through the high definition multimedia interface, so as to search for data related to the word; and
   a user interface for operating the computer, wherein the user interface is a software keyboard or a tactile user interface,
   wherein the controller comprises:
   a signal generation module for generating a CEC command according to the word; and
   a control module connected to the high definition multimedia interface for commanding the computer to search the word from the internet via the high definition multimedia interface according to the CEC command.

2. The television as claimed in claim 1, wherein the multimedia player comprises:
   a sound player for playing sound.

3. The television as claimed in claim 1, wherein the multimedia player comprises:
   a program guide module for displaying an electronic program guide.

4. The television as claimed in claim 1, further comprising:
   a receiver for acquiring a frame from the computer; and
   a switcher for showing the frame.

5. The television as claimed in claim 2, wherein the grabber comprises:
   a buffer module for storing a wave file according to the sound; and
   a speech recognizer for transforming the wave file into the word.

6. The television as claimed in claim 3, wherein the grabber comprises:
   a sampling module for acquiring the word from the electronic program guide.

7. A method for operating a television, comprising following steps:
   (a) producing at least one word when the television plays the information, the television comprising a display module for displaying at least one frame, wherein the step (a) comprises recognizing subtitles in the frame that is displayed by the display module and further dividing the subtitles that are recognized in the frame into various words according to a hyphenation dictionary when the display module displays the frame;
   (b) controlling a computer through a high definition multimedia interface, so as to search for data related to the word, wherein the step (b) comprises: generating a CEC command according to the word; and commanding the computer to search the word from internet via the high definition multimedia interface according to the CEC command, wherein the high definition multimedia interface connects the television and the computer; and
   (c) operating the computer via a user interface that is a software keyboard or a tactile user interface.

8. The method as claimed in claim 7, wherein the step (b) comprises:
   storing a wave file according to sound when the television plays the sound; and
   transforming the wave file into words.

9. The method as claimed in claim 7, wherein the step (b) comprises:
   acquiring the word from an electronic program guide when the television displays the electronic program guide.

10. The method as claimed in claim 7, further comprising:
    acquiring a frame from the computer; and
    showing the frame.

* * * * *